(12) United States Patent
Cambonie et al.

(10) Patent No.: US 6,564,236 B1
(45) Date of Patent: May 13, 2003

(54) DEVICE AND ASSOCIATED METHOD FOR CALCULATING THE DIRECT OR INVERSE FOURIER TRANSFORM OF THE PRODUCT OF A COMPLEX SYMBOL TIMES A COMPLEX SINUSOIDAL WAVEFORM

(75) Inventors: Joël Cambonie, La Combe de Lancey (FR); Simone Mazzoni, Grenoble (FR)

(73) Assignee: STMicroelectronics SA, Gentilly (FR)

( * ) Notice: Subject to any disclaimer, the term of this patent is extended or adjusted under 35 U.S.C. 154(b) by 0 days.

(21) Appl. No.: 09/491,001

(22) Filed: Jan. 25, 2000

(30) Foreign Application Priority Data

Jan. 25, 1999 (FR) ............................................. 99 00770

(51) Int. Cl.[7] ............................................... G06F 17/14
(52) U.S. Cl. ....................................................... 708/404
(58) Field of Search ................................. 708/404, 405, 708/406, 403

(56) References Cited

U.S. PATENT DOCUMENTS

| | | | |
|---|---|---|---|
| 4,101,738 A | * | 7/1978 | Bellanger et al. ........... 370/484 |
| 6,195,675 B1 | * | 2/2001 | Wang et al. ................. 708/312 |
| 6,393,066 B1 | * | 5/2002 | Moretti et al. .............. 370/464 |
| 6,408,319 B1 | * | 6/2002 | Cambonie .................... 708/406 |
| 2001/0051967 A1 | * | 12/2001 | Jaber .......................... 708/403 |

OTHER PUBLICATIONS

Fliege, "Orthogonal Multiple Carrier Data Transmission", European Transactions on Telecommunications and Related Technologies, vol. 3, No. 3, May/Jun. 1992 pp. 255–264.

Shousheng He et al., "Designing pipeline FFT proccesor for ODF (de) modulation" 1998 URSI International Symposium on Signals, Systems and Electronics –Conference Proceedings, Sep. 29, 1998 pp. 257–262.

* cited by examiner

*Primary Examiner*—David H. Malzahn
(74) *Attorney, Agent, or Firm*—Allen, Dyer, Doppelt Milbrath & Gilchrist, P.A.; Lisa K. Jorgenson

(57) ABSTRACT

A device includes a processor able to calculate the direct or inverse Fourier transform of the product of a complex input symbol of size N times a complex sinusoidal waveform of period n. The calculation is performed on the basis of elementary processes of the butterfly type corresponding to several stages of a general butterfly-shaped calculation graph where n is an integer less than N. The processor includes a first elementary processor able to simultaneously perform the multiplication and the Fourier transform calculations relating to the first stage of the graph.

14 Claims, 11 Drawing Sheets

DEVICE AND ASSOCIATED METHOD FOR CALCULATING THE DIRECT OR INVERSE FOURIER TRANSFORM OF THE PRODUCT OF A COMPLEX SYMBOL TIMES A COMPLEX SINUSOIDAL WAVEFORM

FIELD OF THE INVENTION

The invention relates to electronic calculating devices making it possible to calculate the direct or inverse Fourier transform of the product of a complex input symbol of size N times a complex sinusoidal waveform of period n, and their modes of operation. The invention applies, for example, to devices having a so-called "serial" or "pipelined" architecture.

BACKGROUND OF THE INVENTION

In numerous applications, especially in digital terrestrial television applications, using OFDM (Orthogonal Frequency Division Multiplexing) coding for transmission, it is necessary to multiply the input symbol by a complex exponential, before performing the direct or inverse Fourier transform, in particular for adaptive equalization purposes. The solution presently used includes performing the multiplication in a multiplier whose output drives the processor dedicated to the Fourier transform calculations. However, this leads to extra hardware and requires an additional rounding mechanism. So as not to impair the accuracy of calculation, it is necessary to provide additional bits, i.e. to increase the size of the data paths.

Numerous implementations of Fourier transforms which are dedicated or programmed on microprocessors for signal processing are known. Most of these implementations use a variant of the Cooley-Tukey algorithm, well known to the person skilled in the art, which makes it possible to reduce the number of arithmetic operations required to calculate the Fourier transform. In particular, this algorithm thus makes it possible to reduce the calculation of a fast Fourier transform of initial size $r^p$, where r represents the "radix" according to the terminology customarily used by the person skilled in the art, into that of r Fourier transforms of size $r^{p-1}$ and of additional complex additions and multiplications. By iteratively repeating this reduction, we arrive at the calculation of Fourier transforms of size r, which are easily achievable, especially if r is chosen equal to 2 or 4.

The Cooley-Tukey algorithm uses a calculation graph exhibiting a general butterfly-shaped structure, well known to the person skilled in the art, and commonly referred to by the term "butterfly". Several hardware architectures are then possible in order to implement a butterfly-shaped calculation structure.

A first solution includes constructing a hardware operator capable of performing a butterfly-type calculation, per butterfly of the graph. However, such a solution can only be implemented for Fourier transforms of small size. A second solution includes constructing just a single hardware operator of the butterfly type for successively performing the calculations corresponding to all the butterflies of all the stages of the graph. Such a solution requires on the one hand a very fast hardware operator, and on the other hand an input memory which is separate from the memory serving to write the intermediate calculation results. This is to avoid access conflicts when a data block enters the operator while the previous block is still undergoing processing.

An intermediate solution includes constructing a hardware operator of the butterfly type per stage of the graph, as well as a storage element, such as, for example, delay lines or shift registers, whose function is to input the data into the operator in the correct order with respect to the butterflies of the graph of the relevant stage. Such architectures are said to be "serial" or "pipelined" according to the usual terminology employed by the person skilled in the art.

More precisely, an electronic device for calculating a Fourier transform of so-called "pipelined architecture" comprises a plurality of successive processing stages connected in series between the input and the output of the device by internal data paths. These stages respectively comprise elementary processing means able to perform processings of Fourier transforms of elementary sizes which are smaller than the initial size, on data blocks of sizes which are successively reduced from one stage to the next and, elementary storage means. The expression "initial size" of the Fourier transform is understood to mean the size of the blocks received at the input of the device by the first stage, here and in the subsequent text. The elementary sizes of the Fourier transforms performed by the various stages can be identical and equal to the radix of the Fourier transform. Thus, there may be a "uniform" radix Fourier transform or "mixed" radix Fourier transforms which may differ from one stage to another.

SUMMARY OF THE INVENTION

An object of the invention is to perform the multiplication of an input symbol times a complex exponential while eliminating any additional rounding component other than those already existing with respect to Fourier transform processing.

Another object of the invention is to eliminate any additional calculation noise, while also reducing the additional hardware required to perform this multiplication.

The invention applies to any type of hardware architecture capable of implementing a butterfly-shaped calculation structure. More precisely, the invention proposes an electronic device, comprising processing means able to calculate the direct or inverse Fourier transform of the product of a complex input symbol of size N times a complex sinusoidal waveform of period n, on the basis of elementary processings of the butterfly type corresponding to several stages of a general butterfly-shaped calculation graph. According to a general characteristic of the invention, n is an integer less than N, and the processing means comprise first elementary processing means able simultaneously to perform the multiplication and the Fourier transform calculations relating to the first stage of the graph.

In other words, the invention proposes to carry out the complex multiplication of the input symbol times the sinusoidal waveform of period n, simultaneously with the butterfly-type processings relating to the first stage of the calculation graph. In practice, if a pipelined architecture is used, the complex multiplication will be implemented within the first processing stage (input stage) of the pipelined-architecture device. The other processing stages are not modified relative to the conventional stages of Fourier transform processing.

According to one embodiment of the invention, which applies to any type of hardware architecture, e.g. pipelined or otherwise, the first elementary processing means comprises:

a complex adder/subtractor module of the modified butterfly type with respect to the rank z of the data item within the input symbol and the value of n modulo r, where r denotes the radix of the elementary Fourier transform associated with the first stage;

a memory containing N complex coefficients respectively equal to $e^{2jq\pi/N}$, q being an integer;

computation means able to determine the integer q on the basis of the rank z of the input data item, (z varying from 0 to N−1) of the sector p in which the input data item lies (p varying from 0 to r−1) and of n; and a multiplier able to perform the multiplication of the coefficients extracted successively from the memory times the output values delivered successively by the complex adder/subtractor module.

More precisely, for a direct Fourier transform, the integer q is equal to (p−n)i modulo N, where i is equal to z modulo N/r, and the computation means advantageously comprises a first multiplier calculating the sector p by performing the product of the rank z of the input data item times the ratio r/N.

BRIEF DESCRIPTION OF THE DRAWINGS

Other advantages and characteristics of the invention will become apparent on examining the detailed description of embodiments and implementations, which are in no way limiting, and the appended drawings in which.

DETAILED DESCRIPTION OF THE PREFERRED EMBODIMENTS

Figure 1:
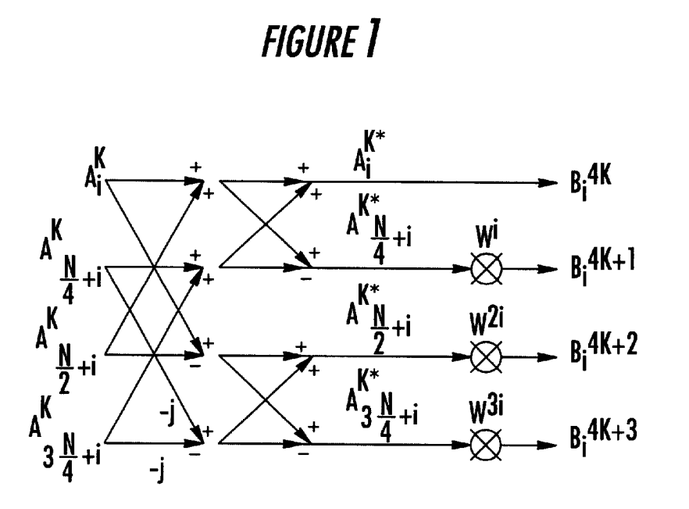
FIG. 1 illustrates a conventional operator of a radix 4 butterfly-shaped Fourier transform.

Reference will now be made more particularly to FIG. 1. In general, if for a radix 4 processing stage, the size of the data block received at input is equal to N, this data block can be decomposed into four segments of N/4 data items each, temporally received consecutively. The first segment is formed of the data $A_i^K$, the second segment is formed of the data $A_{N/4+i}^K$, the third segment is formed of the data $A_{N/2+i}^K$ and the fourth segment is formed of the data $A_{3N/4+i}^K$, i varying from 0 to N/4−1, and representing the number of processings of the butterfly type performed in the stage on each data block received. K represents the $K^{th}$ block received by the stage, and i is equal to z modulo 4 where z represents the rank of the data item in the block (or symbol).

Moreover, the person skilled in the art will appreciate that if s denotes the rank of the relevant stage, N is equal to $NO/4^s$ where NO denotes the initial size of the Fourier transform, i.e. the size of each symbol received by the input stage. Furthermore, if the relevant stage is the first, N is equal to NO and the $K^{th}$ block corresponds to the $K^{th}$ symbol received. On the other hand, if the relevant stage is not the first (rank s different from 0), each symbol input to the device is decomposed recursively within each stage into $4^s$ blocks K (K varying from 0 to $4^s-1$).

The result of these butterfly-type processings are intermediate data which are also ordered into four intermediate segments each containing N/4 intermediate data items. More precisely, the first intermediate segment contains the intermediate data $A_i^{K^*}$, the second intermediate segment contains the intermediate data $A_{N/4+i}^{K^*}$, the third intermediate segment contains the data $A_{N/2+i}^{K^*}$ and the fourth intermediate segment contains the data $A_{3N/4+i}^{K^*}$.

These intermediate data are obtained according to the following formulas (I) to (IV):

$$A_i^{K^*} = A_i^K + A_{N/4+i}^K + A_{N/2+i}^K + A_{3N/4-i}^K \quad (I)$$

$$A_{N/4+i}^{K^*} = A_i^K - A_{N/4+i}^K + A_{N/2+i}^K - A_{3N/4+i}^K \quad (II)$$

$$A_{N/2+i}^{K^*} = A_i^K - j A_{N/4-i}^K - A_{N/2+i}^K + j A_{3N/4+i}^K \quad (III)$$

$$A_{3N/4+i}^{K^*} = A_i^K + j A_{N/4-i}^K - A_{N/2+i}^K - j A_{3N/4+i}^K \quad (IV).$$

In these formulas, j denotes the complex number whose square is equal to −1, and i varies from 0 to N/4−1.

These intermediate data are next multiplied by predetermined coefficients $W^0$ (i.e. 1), $W^i$, $W^{2i}$ and $W^{3i}$ according to the relevant segments. These coefficients are conventional complex coefficients which are well known to the person skilled in the art, given by the formula:

$W^{pi} = e^{-2j\pi pi/N}$ where p varies from 0 to 3 and i from 0 to N/4−1.

After multiplying by these coefficients W, four blocks $BB^{4K}$, $BB^{4K+1}$, $BB^{4K+2}$, $B_i^{4K+3}$ which respectively contain N/4 output data $B_i^{4K}$, $B_i^{4K+1}$, $B_i^{4K+2}$ and $B_i^{4K+3}$, with i varying from 0 to N/4−1, are obtained at the output of the processing stage. All the blocks BB will then be processed consecutively by the elementary processing means of the following stage, each of these blocks being regarded as an input symbol for this following stage.

Figure 2:
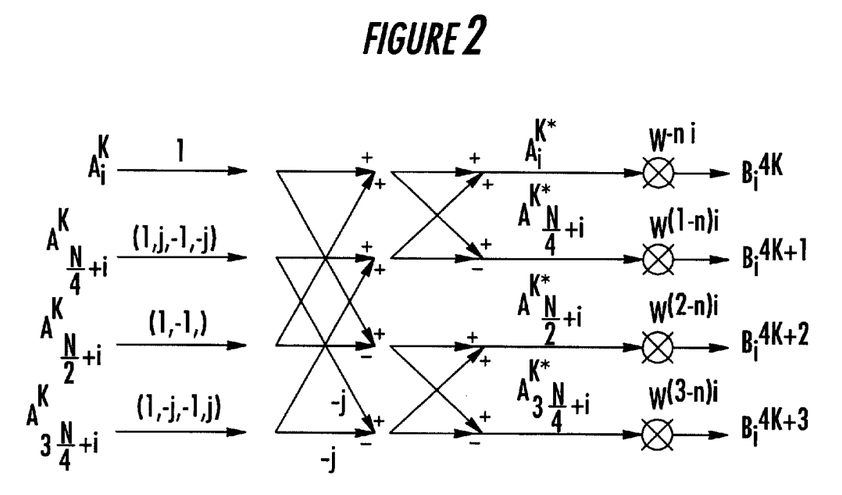
FIG. 2 illustrates a complex operator of the butterfly type according to the invention.

FIG. 2 illustrates a complex operator of the radix 4 butterfly type, according to the invention, making it possible to calculate FFT(exp(2jπnz/N)$A_z$)

in which FFT denotes the direct Fourier transform operator, N is the size of the input symbol A (N=NO=2048 for example), and in which n is an integer denoting the period of the complex sinusoidal waveform intended to be multiplied with the data $A_z$ (z varying from 0 to N−1) of the input symbol.

It has then been observed according to the invention that the complex adder/subtractor module of the butterfly type could be simply modified relative to a complex adder/subtractor module of the butterfly type such as the one illustrated in FIG. 1, by allocating the input data $A_z$ multiplier coefficients f(n,z) such as defined in Table 1 below.

TABLE 1

| f(n,z) | z = 0 to N/4 − 1 | z = N/4 to N/2 − 1 | z = N/2 to 3N/4 − 1 | z = 3N/4 to N − 1 |
|---|---|---|---|---|
| n = 0 mod 4 | 1 | 1 | 1 | 1 |
| n = 1 mod 4 | 1 | j | −1 | −j |
| n = 2 mod 4 | 1 | −1 | 1 | −1 |
| n = 3 mod 4 | 1 | −j | −1 | j |

These operations are very simple and require, especially within the context of a pipelined architecture, very little additional hardware.

Figure 3:
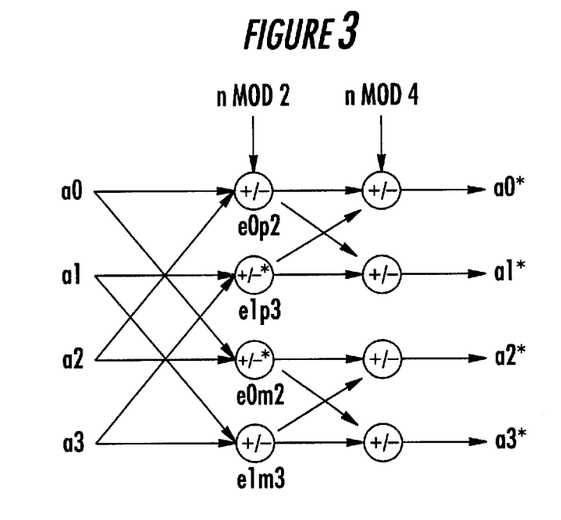
FIG. 3 illustrates more precisely the complex adder/subtractor module of the operator of FIG. 2.

In practice, this complex adder/subtractor module according to the invention may be represented as illustrated in FIG. 3, in which, for simplifying reasons, a0, a1, a2 and a3 respectively denote the data $$A_i^K, A_{N/4+i}^K, A_{N/2+i}^K, A_{3N/4+i}^K,$$

with i varying from 0 to N/4−1, and in which a)*, a1*, a2* and a3* respectively denote the intermediate data $$A_i^{K*}, A_{N/4+i}^{K*}, A_{N/2+i}^{K*}, A_{3N/4+i}^{K*},$$

and e0p2, e0m2, e1p3 and e1m3 are intermediate variables making it possible to define, either the simple addition a+b, or the complex operation −j(a−b). More precisely,
if n modulo 2 is equal to 0, then
e0p2=a0+a2;
e0m2=a0−a2;
e1p3=a1+a3
e1m3=−j(a1−a3);
otherwise
e0p2=a0−a2;
e0m2=a0+a2;
e1p3=−j(a1−a3);
e1m3=a1+a3;
Likewise, if n modulo 4 is equal to 0 or 1, then
a0*=e0p2+e1p3;
a1*=e0p2−e1p3;
otherwise
a0*=e0p2−e1p3;
a1*=e0p2+e1p3;
If, on the other hand, n modulo 4 is equal to 2 or 3, then
a2*=e0m2−e1m3;
a3*=e0m2+e1m3;
otherwise
a2*=e0m2+e1m3;
a3*=e0m2−e1m3.

Such a module according to the invention can easily be constructed by automatic synthesis and the additional hardware is then estimated at 20% relative to a conventional butterfly-type radix 4 complex adder/subtractor module.

The intermediate data A* are next multiplied by complex coefficients, respectively equal to $e^{2jq\pi/N}$, q being an integer. The integer q is computed on the basis of the rank z of the data item of the input symbol, of the sector p in which the input data item lies, p varying from 0 to r−1® denoting the radix of the stage of the graph), and of n. More precisely, q is equal to (p−n)i modulo N, where i is equal to z modulo N/r, i varying in this instance from 0 to (N/r)−1.

Figure 4:
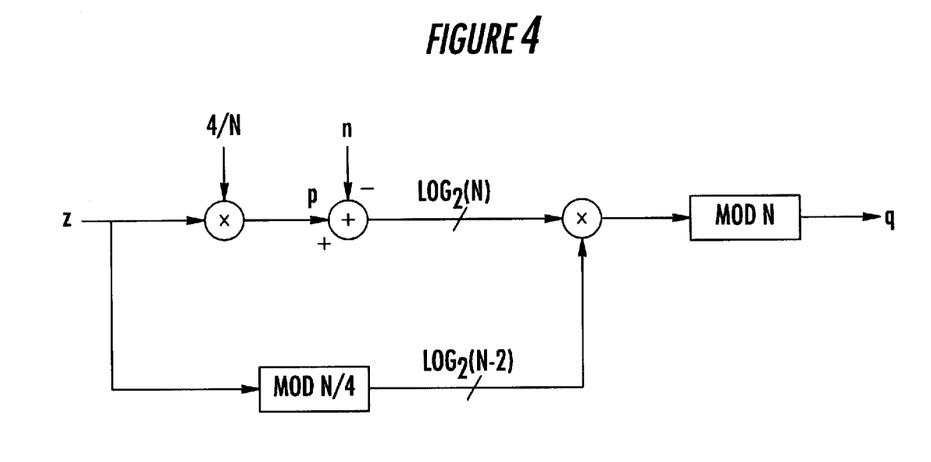
FIG. 4 is a hardware implementation according to the invention, making it possible to address complex coefficients usable both for calculating a Fourier transform and for the complex multiplication by the sinusoidal waveform of period n.

In FIG. 2, representing a radix 4 stage, p varies from 0 to 3, and the modulo term N is not represented. The N complex coefficients, which are decomposed into N real (cosine) coefficient and imaginary (sine) coefficient, are stored in a read only memory at the respective addresses q. A hardware implementation of an address calculator making it possible to determine the address q, i.e. the angle number in the read only memory (q=0 corresponding to a zero angle) is illustrated in FIG. 4.

In this figure it may be seen that the address calculator comprises a first multiplier intended for multiplying the input data item of rank z by the number 4/N so as to determine the angular sector p. A subtractor then makes it possible to subtract the number n from p, so as to obtain a number $\log_2(N)$bits. This number is multiplied by i (equal to z modulo N/4 in the case where the radix is equal to 4). A $\log_2(N) \times \log_2(N-2)$ modulo N multiplier then makes it possible to determine the angle value q.

An embodiment of a calculating device according to the invention, with pipelined architecture, and capable of performing the Fourier transform of an input symbol of size equal to 16, times a complex sinusoidal waveform of period n will now be described while referring more particularly to FIGS. 5 to 8d. This device with pipelined architecture comprises two radix 4 processing stages, ET0 and ET1. According to the invention, only the stage ET0 simultaneously performs the Fourier transform calculations relating to this first stage, and the product times the complex sinusoidal waveform. The processing stage ET1 performs only conventional Fourier transform processings, in accordance with the operator illustrated in FIG. 1.

Figure 5:
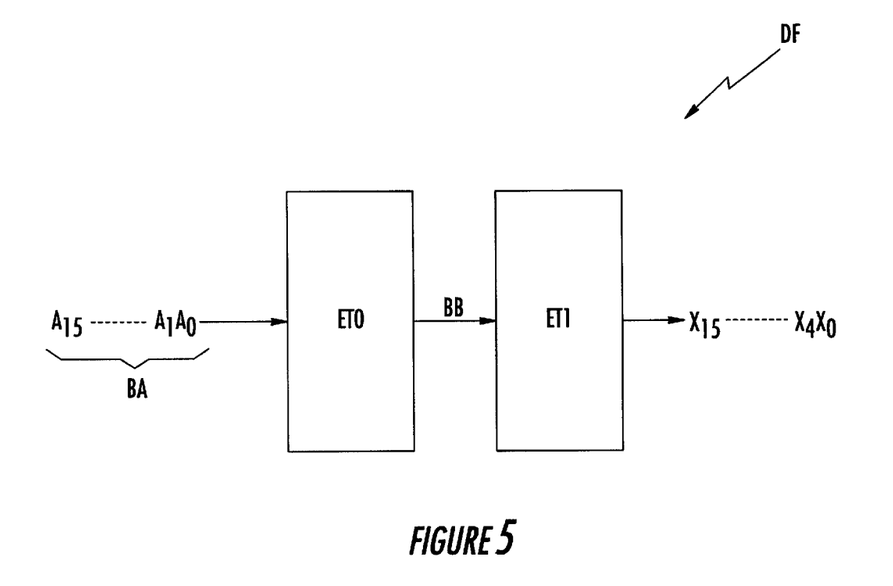
FIG. 5 is a diagrammatic schematic of a device according to the invention with pipelined architecture with two processing stages.

The input stage ET0 receives streams of symbols or data blocks BA, respectively comprising sixteen data items $A_0$–$A_{15}$. The output of the stage ET0 delivers successive blocks BB of four data items which are processed in the stage ET1. This stage ET1 delivers the output symbol $X_{15} \ldots x_4 X_0$ corresponding to the direct Fourier transformation of the product of the input symbol BA times the complex sinusoidal waveform of period n.

Figure 6:
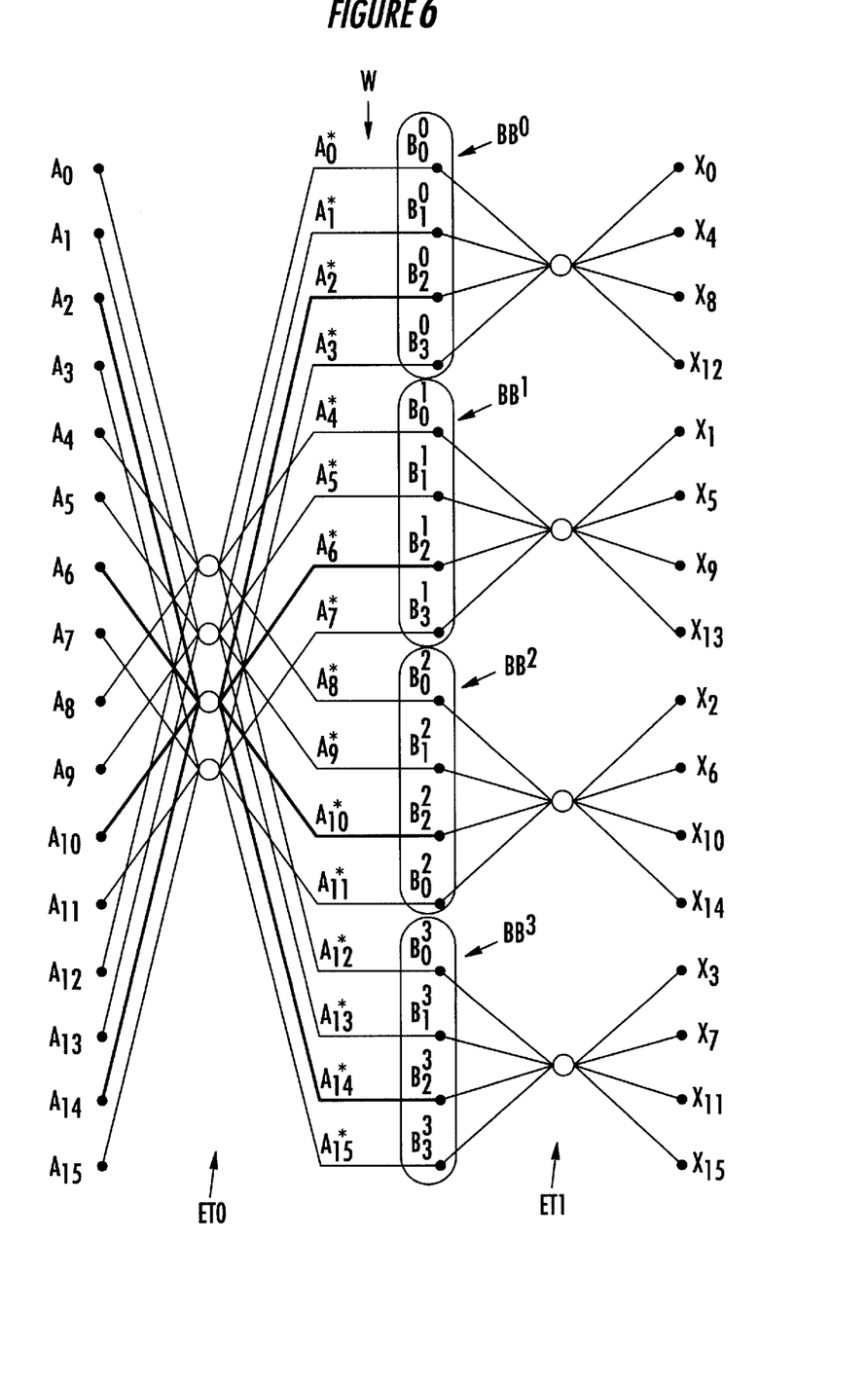
FIG. 6 illustrates the butterfly-type processings performed according to the invention in these stages.

FIG. 6 illustrates the particular case of the sixteen data items (N=16) of each block received by the stage ET0. The radix 4 processing stage then performs N/4 processings of the butterfly type in accordance with the graph of FIG. 2, on N/4 separate groups of four data items formed respectively by a data item of the first segment and the counterpart data of the other three segments. In the particular example of FIG. 6, the stage ET0 performs a first butterfly-type processing on the group formed of the data $A_0$, $A_4$, $A_8$, and $A_{12}$, a second processing of the butterfly type on a second group of data formed of the data $A_1$, $A_5$, $A_9$ and $A_{13}$ and so on up to a fourth processing of butterfly type on the fourth group of data formed of the data $A_3$, $A_7$, $A_{11}$ and $A_{15}$.

The elementary processing means of the step ET1 will in succession perform a butterfly-type processing in accordance with the graph of FIG. 1 on the four data items of each input block BB, so as to obtain intermediate data B*, followed by the output data which are in fact, in the present case, the result of the Fourier transform of the product of the complex exponential of period n times the input data A.

Figure 7:
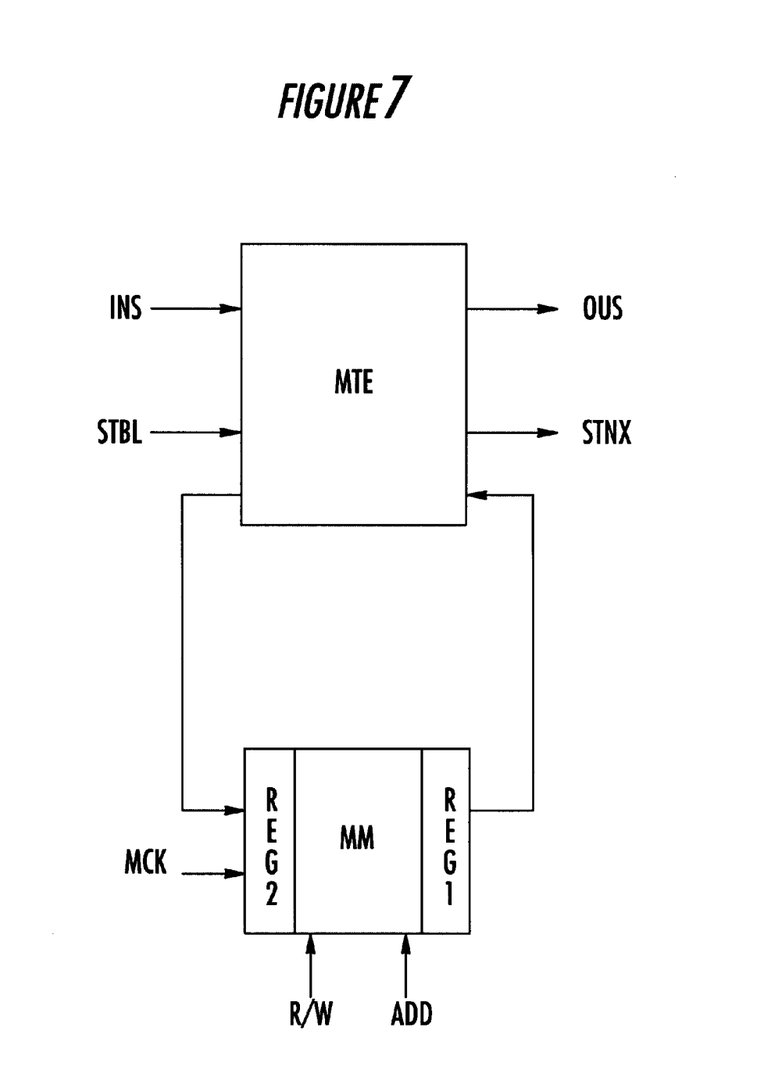
FIG. 7 is a diagrammatic representation of the hardware architecture of a processing stage of the device of FIG. 1.

In FIG. 7, the reference MTE denotes the elementary processing means of a radix 4 processing stage of the device DF. These means MTE comprise an input port receiving the flow INS of the various data blocks originating either from outside the device if the relevant stage is the first (in this case the various blocks represent the various symbols on which the Fourier transform of the product of each symbol times the complex exponential will be performed), or from the preceding stage. The data contained in each of the blocks received are delivered at the rate of a first clock signal SMCK. The processing means MTE are, for their part, regulated by a basic clock signal MCK whose frequency is either twice as large as the frequency of the signal SMCK, or four times as large depending on whether the processing means MTE receive during each cycle of the signal SMCK either the real part and the imaginary part of each data item, or just the real part or the imaginary part. The output data stream OUS is delivered to an output port of this processing stage.

Moreover, the elementary processing means MTE receive a first control signal STBL originating either from outside the device if the relevant stage is the first, or from the preceding stage. This signal STBL indicates, for example when it passes to the "1" state, the receiving of the first data item of a block. Likewise, the elementary processing means MTE deliver to the following stage a second control signal STMX indicating, for example when it passes to the "1" state, the sending of the first output data item arising from the processing of the said input block. The signal STBL received by the current stage is then the signal STNX sent by the preceding stage.

Apart from these elementary processing means, the radix 4 processing stage comprises elementary storage means composed here of a single-access random access memory MM looped back to the elementary processing means MTE by way of a first register or latch REG1 connected to the output of the memory MM, and by way of a second register or latch REG2 connected to the input of the memory MM. The memory MM is write/read controlled by a signal R/W. When this signal is equal to "1" for example, there is a read and when it is equal to "0" there is a write. Moreover, the memory is addressed by an address pointer ADD. Either a write access, or a read access of the memory MM is performed at each cycle of the basic clock signal MCK. Therefore, a read access followed by a write access of the memory is performed at each cycle of the first clock signal SMCK.

Figure 8:
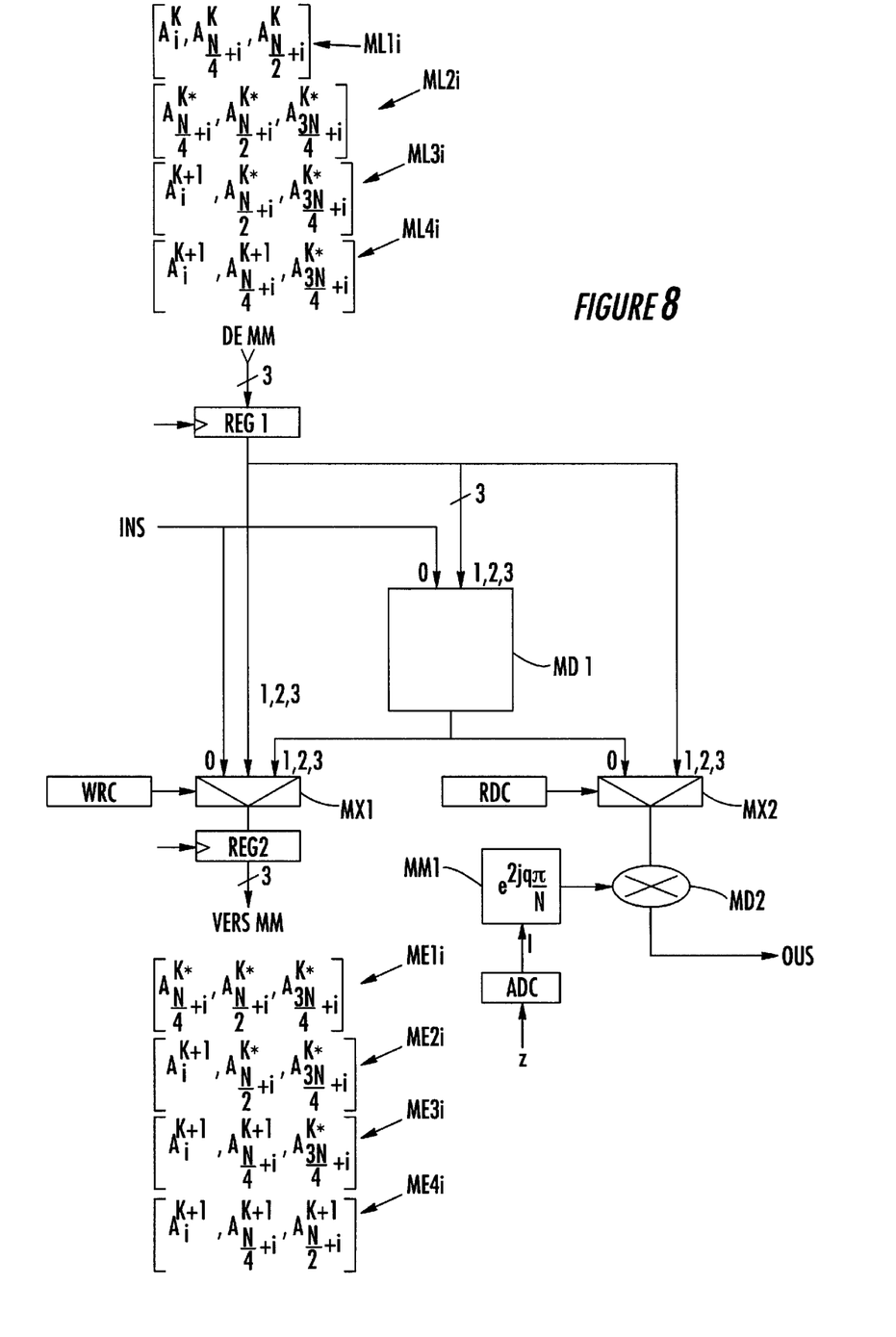
FIG. 8 illustrates in greater detail some of the means illustrated in FIG. 7 and implemented in the first processing stage.
Figure 9A:
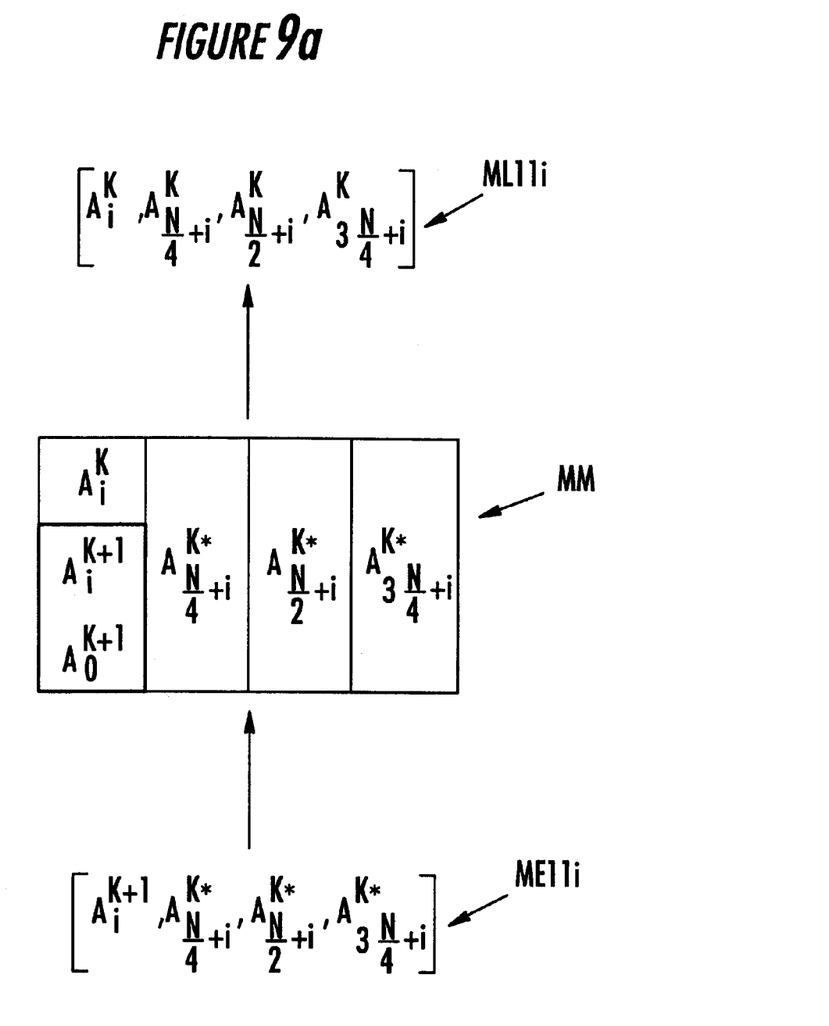
FIGS. 9a to 9d diagrammatically illustrate the configuration of a memory of a device according to the invention with pipelined architecture and the employing of this device in the case of a data resealing within a radix 4 processing stage with pipelined architecture.
Figure 9B:
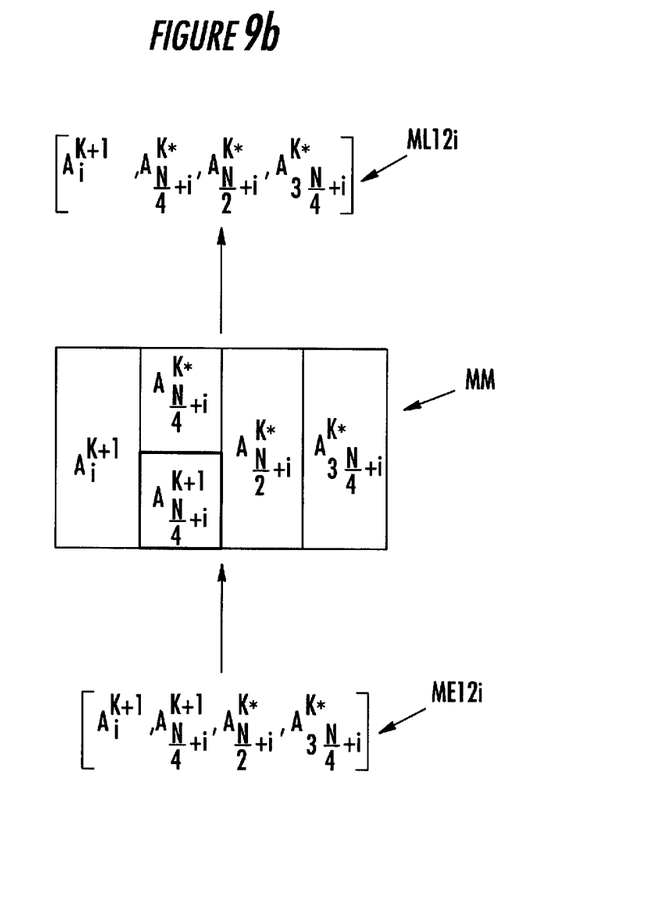
Figure 9C:
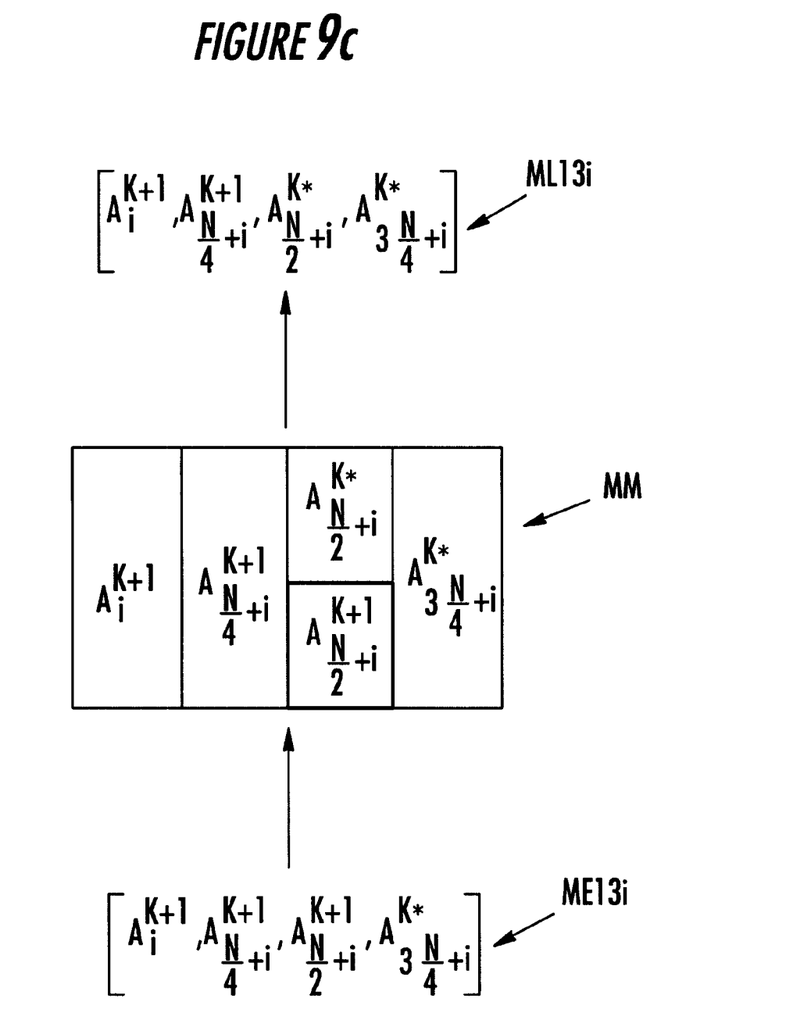
Figure 9D:
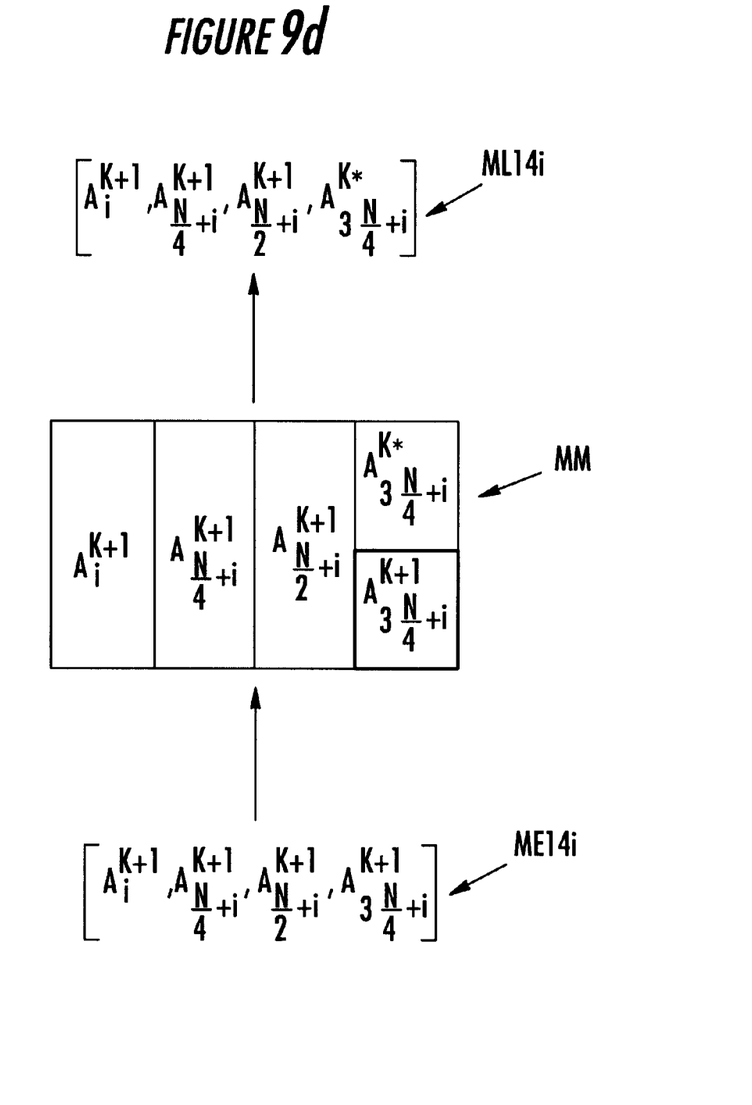

It will now be assumed, while referring more particularly to FIG. 8, that the radix 4 processing stage is the first stage ET0 and that it is of a first type within which no calculations of the dynamic range of the data are performed. In this case, the storage capacity of the elementary storage means of the processing stage is equal to 3N/4 data items. With respect to the presence of two pipeline levels, i.e. two registers REG1 and REG2, the storage capacity of the memory is equal to N/4−1 words of three data items while each register REG1, REG2 is able to store a word of three data items. The memory MM can therefore be represented as a matrix of N/4−1 rows and 3 columns.

The elementary processing means comprise a complex adder/subtractor module MD1 making it possible to calculate the intermediate data according to the formulas deduced from FIGS. 2 and 3, as well as a multiplier module MD2 making it possible to multiply these intermediate data by the appropriate coefficients W. The output of the multiplier module therefore delivers the output data stream OUS. The four outputs 0, 1, 2, 3 of the module MD1 respectively deliver the intermediate data $A_i^{K^*}$, $A_{N/4+i}^{K^*}$, $A_{N/2+i}^{K^*}$, $A_{3N/4+i}^{K^*}$ of the four intermediate segments.

The input port of the stage, receiving the stream INS of input data, as well as the three outputs 1, 2, 3 of the first register REG1 are connected respectively to the four inputs 0, 1, 2, 3 of the adder module MD1. The input port of this stage is moreover linked to the input 0 of a first multiplexer with four inputs MX1 whose three outputs are linked to the three inputs of the register REG2. The other three inputs 1, 2 and 3 of the first multiplexer MX1 are at the same time linked to the three outputs 1, 2, 3 of the register REG1 and to the three outputs 1, 2 and 3 of the module MD1.

The output 0 of the module MD1 is linked to the input 0 of a second multiplexer MX2 with four inputs whose output is linked to the input of the multiplier module MD2. The other three inputs 1, 2 and 3 of the second multiplexer are linked to the three outputs of the first register REG1. The data of each input block are indexed by a first counter (write counter) WRC modulo N counting from 0 to N−1 for example at the frequency of the first clock signal SMCK. Likewise, the output data are indexed from 0 to N−1 by a second counter modulo N, or read counter RDC, also counting for example from 0 to N−1 at the frequency of the first clock signal.

In this regard, it should be noted that the rising of the first control signal STBL to 1, indicating the receiving of the first data item of the block, reinitializes the counter WRC while the rising of the second control signal STNX to 1 signaling the sending of the first output data item, reinitializes the read counter RDC. The person skilled in the art will recognize that, according to the invention, the second control signal STNX passes to the 1 state when the first counter WRC reaches the value 3N/4−1.

The write counter WRC controls the first multiplexer MX1. More precisely, when the counter WRC is counting from 0 to N/4−1, the three inputs 1, 2, 3 of the register REG2 respectively receive the data item available at the input of the stage, and the values available at the outputs 2 and 3 of the register REG1. When the counter WRC is counting from N/4 to N/2−1, the three inputs 1, 2, 3 of the register REG2 respectively receive the value available at the output 1 of the register REG1, the data item available at the input of the processing stage and the value available at the output 3 of the register REG1. When the counter WRC is counting from N/2 to 3N/4−1, the inputs 1, 2 and 3 of the register REG2 respectively receive the value delivered at the output 1 of the register REG1, the value delivered at the output 2 of the register REG1, and the data item available at the input of the processing stage. Finally, when the counter WRC is counting from 3N/4 to N−1, the three inputs 1, 2 and 3 of the register REG2 respectively receive the values delivered by the outputs 1, 2 and 3 of the module MD1.

The register REG2 then stores the three data items which will be written at the following clock cycle to the memory MM. The counter RDC controls the multiplexer MX2. More precisely, when the counter RDC is counting from 0 to N/4−1, the multiplier module MD2 will receive the value delivered by the output 0 of the module MD1. When the counter RDC is counting from N/4 to N/2−1, the module MD2 will receive the value available at the output 1 of the register REG1. When the counter RDC is counting from N/2 to 3N/4−1, the module MD2 will receive the value available at the output 2 of the register REG1. When the counter RDC is counting from 3N/4 to N−1, the module MD2 will receive the value available at the output 3 of the register REG1.

The address signal ADD for the memory MM is delivered by a counter modulo N/4−1 (not represented here for simplifying purposes) counting for example from 0 to N/4−2 at the frequency of the first clock signal SMCK. The values of the sines and of the cosines of the complex coefficients W, which will be used in the module MD2, are stored in the read only memory MM1 addressed by the output of the address calculator ADC such as that illustrated in FIG. 4.

The filling of the memory MM as well as the mode of operation of the elementary processing means of this stage will now be described in greater detail, while still referring more particularly to FIG. 8 (and by assuming furthermore for simplifying purposes, that no guard interval separates two consecutive symbols input to the calculating device). Assume that the memory MM contains the data $A_i^K$, $A_{N/4+i}^K$, $A_{N/2+i}^K$ of the first three segments of block K which were stored as and when they were received, i.e. as and when the counter WRC was counting from 0 to 3N/4−1. Here and in the subsequent text, i varies from 0 to N/4−1 at the rate of the counter WRC.

When the counter WRC is next counting from 3N/4 to N−1, the stage receives in succession as input the data $A_{3N/4+i}^K$ of the fourth segment of the block. However, these data are not stored in the memory MM and are used with the counterpart data of the first three segments to calculate the intermediate data $A_i^{K*}$, $A_{N/4+i}^{K*}$, $A_{N/2+i}^{K*}$ and $A_{3N/4+i}^{K*}$ of the four intermediate segments. However, the intermediate data $A_i^{K*}$ of the first intermediate segment are not stored in the memory MM and are transmitted directly to the multiplier module MD2.

On the other hand, as and when the data of the fourth segment of block K are received, the data stored in the memory MM and relating to the first three segments of block K are replaced respectively by the intermediate data calculated by the module MD1 and relating to the last three intermediate segments. Stated otherwise, referring again to FIG. 8, when the counter is counting from 3N/4 to N−1, the words ML1i are extracted from the memory while the words ME1i will be stored in the memory via the register REG2.

In the following step, i.e. when the counter WRC is counting from 0 to N/4−1 corresponding to the receiving of the data of the first segment of block K+1, the words ML2i (i varying from 0 to N/4−1) corresponding to the preceding write words ME1i are extracted in succession from the memory. The intermediate data of the second segment of block K are delivered to the multiplier module MD2 and write words ME2i still containing the intermediate data of the last two segments of block K and also the data of the first segment of block K+1, and which have been substituted for the intermediate data of the second segment of block K, are restored in the memory MM.

A similar operation is performed when the counter is counting from N/4 to N/2−1 with the read words ML3 and ME3 (i still varying from 0 to N/4−1) and then with the read words ML4 and ME4 when the counter is counting from N/2 to 3N/4−1. At the conclusion of this step, the memory MM again contains the data of the first three segments of block K+1 and a new complete write/read cycle can recommence.

The hardware structure of the processing stage ET1 differs simply from the structure of the stage ET0 as illustrated in FIG. 8, through the fact that the operator MD1 is in accordance with the graph of FIG. 1. Furthermore, the read only memory MM1 also contains the values of the sines and cosines of the conventional complex coefficients W for calculating a Fourier transform. The memory MM1 can then be addressed directly by the read counter RDC.

The person skilled in the art will therefore have noted that the invention makes it possible to perform in a simple way the direct Fourier transform of the product of the input symbol times the complex sinusoidal waveform while doing away with the calculation noise generated by an additional multiplier arranged ahead of the input stage. Furthermore, the surplus hardware is limited and the elementary processings can be performed without any rounding mechanism other than those already conventionally existing in the processing stages implementing Fourier transforms.

When it is necessary to perform within a radix 4 processing stage an evaluation of the dynamic range of the data so as to rescale them, the storage capacity of the memory MM is increased by one column. Likewise, the storage capacity of the registers REG1 and REG2 is increased by one data item. The hardware architecture of such a processing stage is then similar to that illustrated in FIG. 8 (in the case where this stage is the first). Of course, the person skilled in the art will readily be able to modify the multiplexers as well as the associated control and the addressing of the matrix MM having regard to the mode of operation and of filling of this matrix which will be described in greater detail while referring more particularly to FIGS. 9a to 9d.

In general, in this embodiment, the memory MM stores all the data of the four segments of a current block K. It is assumed that this has been carried out just ahead of the step illustrated in FIG. 9a. In this figure, as and when the data of the first segment of the following block K+1 are received, the words ML11i containing the data of the four segments of block K are read while the words ME11i containing the data of the first segment of the following block K+1 as well as the intermediate data of the last three intermediate segments of block K are stored in the memory MM. (It should be noted here that the reading of the data of the four segments of block K has made it possible to rescale these data (in a known manner), for example by dividing by the maximum value, the intermediate data having subsequently been calculated on these rescaled data. For simplifying purposes, these dynamic range calculation and resealing means have not been represented). More precisely, the data of the first segment of the following block K+1 are substituted in the first column for the data of the first segment of block K while the intermediate data of the last three intermediate segments of block K are substituted in the other three columns of the matrix, for the data of the last three segments of block K.

In the following step (FIG. 9b), i.e. when the counter is counting from N/4 to N/2−1, the words ML12i are extracted from the memory and the data of the second segment of the following block K+1 are substituted for the intermediate data of the second segment of block K, the other intermediate data being rewritten to the memory MM (write words ME12i). The operation is repeated in this way for the third and fourth segments of the block K+1 (FIG. 9c, FIG. 9d) with the words ML13i, ME13i and ML14i and ME14i. At the conclusion of the step represented in FIG. 9d, the memory contains all the data of the following block K+1 allowing a new calculation on rescaled data.

Figure 10:
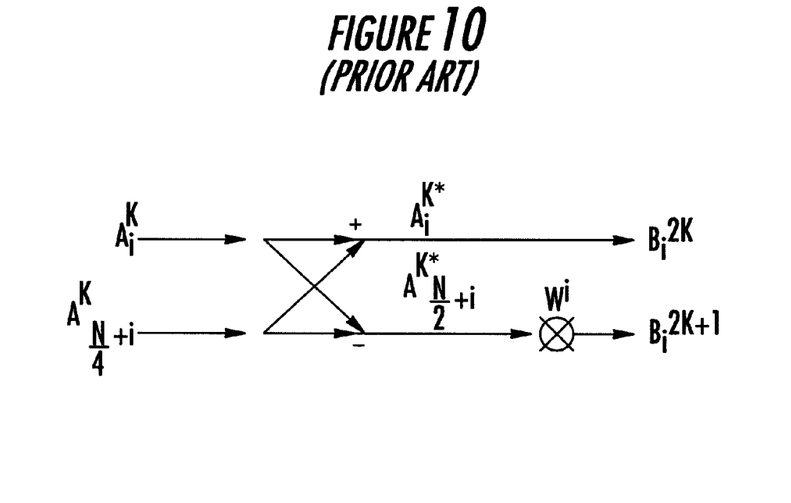
FIG. 10 illustrates a conventional operator of a radix 2 butterfly-shaped Fourier transform.
Figure 11:
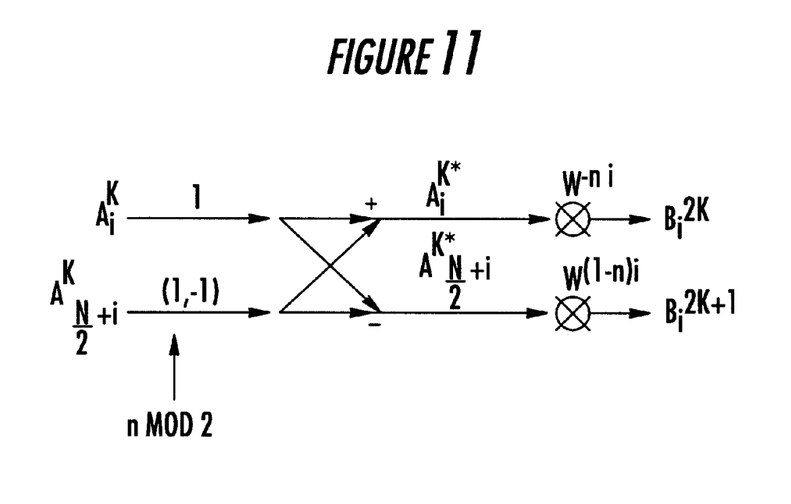
FIG. 11 illustrates a radix 2 butterfly-type operator according to the invention.

Of course, everything just described in respect of radix 4 elementary Fourier transforms can be applied to elementary Fourier transforms with radix r different from 4, in particular with radix 2. More precisely, in this case, while FIG. 10 illustrates the radix 2 butterfly-type operator used conventionally for Fourier transform calculations, FIG. 11 illustrates a radix 2 operator modified according to the invention, so as to allow multiplication of the input symbol A by the complex sinusoidal waveform of period n.

As may be seen in FIG. 11, and in a similar manner to what was described with reference to Table 1, the modifying of the complex adder/subtractor module of the operator amounts to multiplying the symbol A by the multiplier coefficient f(n,z) in accordance with Table 2 below:

TABLE 2

| f(n,z) | z = 0 to N/2 − 1 | z = N/2 to N − 1 |
|---|---|---|
| n = 0 mod 2 | 1 | 1 |
| n = 1 mod 2 | 1 | −1 |

The complex coefficients are equal to $e^{2jq\pi/N}$, where q is equal to (p−n)i modulo N, with i equal to z modulo N/2 and varying from 0 to N/2−1, and p equal to 0 or 1.

Finally, everything described previously in respect of direct Fourier transform processings applies equally to inverse Fourier transform processings by replacing the value n by −n modulo N.

What is claimed is:

1. A device comprising:

processing means to calculate the direct or inverse Fourier transform of the product of a complex input symbol of size N times a complex sinusoidal waveform of period n, on the basis of elementary processes of a butterfly type corresponding to several stages of a generally butterfly-shaped calculation chart, n being an integer less than N; and the processing means comprising first elementary processing means to simultaneously obtain the product and perform the Fourier transform calculations relating to a first stage of the chart.

2. A device according to claim 1, wherein the first elementary processing means comprises:

a complex adder/subtractor module of a modified butterfly type with respect to a rank z of a data item within the complex input symbol and the value of n modulo r, where r denotes the radix of the Fourier transform associated with the first stage;

a memory containing N complex coefficients respectively equal to $e^{2jq\pi/N}$, q being an integer;

computation means to compute the integer q on the basis of the rank z of the data item, of the sector p in which the data item lies, p varying from 0 to r−1, and of n;

a multiplier to perform multiplication of coefficients extracted successively from the memory times output values delivered successively by the complex adder/subtractor module.

3. A device according to claim 2, wherein the Fourier transform is direct, the integer q is equal to (p−n)i modulo N, where i is equal to z modulo N/r, and the computation means comprises a first multiplier calculating the sector p by performing multiplication of the rank z of the data item times a ratio r/N.

4. A device according to claim 2, wherein the radix r is equal to 2 or 4.

5. A device according to claim 1, wherein the device has a pipelined architecture.

6. A device comprising:

a processor to obtain a product of a complex input symbol of size N times a complex sinusoidal waveform of period n, and to calculate a Fourier transform of the product on the basis of butterfly type elementary processes corresponding to several stages of a generally butterfly-shaped calculation chart, n being an integer less than N, the processor comprising a first elementary processor to simultaneously obtain the product and calculate the Fourier transform relating to a first stage of the several stages of the chart.

7. A device according to claim 6, wherein the first elementary processor comprises:

a complex adder/subtractor module of a modified butterfly type with respect to a rank z of a data item within the complex input symbol and the value of n modulo r, where r denotes the radix of the Fourier transform associated with the first stage;

a memory containing N complex coefficients respectively equal to $e^{2jq\pi/N}$, q being an integer;

a computation unit to compute the integer q on the basis of the rank z of the data item, of the sector p in which the data item lies, p varying from 0 to r−1, and of n;

a multiplier to perform multiplication of coefficients extracted successively from the memory times output values delivered successively by the complex adder/subtractor module.

8. A device according to claim 7, wherein the integer q is equal to (p−n)i modulo N, where i is equal to z modulo N/r, and the computation unit comprises a first multiplier calculating the sector p by performing multiplication of the rank z of the data item times a ratio r/N.

9. A device according to claim 7, wherein the radix r is equal to 2 or 4.

10. A device according to claim 6, wherein the device has a pipelined architecture.

11. A method of calculating a Fourier transform on the basis of butterfly type elementary processes corresponding to several stages of a generally butterfly-shaped calculation chart, the method comprising the steps of:

obtaining a product of a complex input symbol of size N times a complex sinusoidal waveform of period n, n being an integer less than N; and simultaneously calculating a Fourier transform of the product relating to a first stage of the several stages of the chart.

12. A method according to claim 11, further comprising the steps of:

obtaining output values from a complex addition/subtraction phase of a modified butterfly type with respect to a rank z of a data item within the complex input symbol and the value of n modulo r, where r denotes the radix of the Fourier transform associated with the first stage;

storing N complex coefficients respectively equal to $e^{2jq\pi/N}$, q being an integer, in a memory;

computing the integer q on the basis of the rank z of the data item, of the sector p in which the data item lies, p varying from 0 to r−1, and of n;

multiplying coefficients extracted successively from the memory times the output values.

13. A method according to claim 12, wherein the integer q is equal to (p−n)i modulo N, where i is equal to z modulo N/r, and the computing step comprises calculating the sector p by performing multiplication of the rank z of the data item times a ratio r/N.

14. A method according to claim 11, wherein the radix r is equal to 2 or 4.

* * * * *